United States Patent
Garg et al.

(10) Patent No.: US 9,128,771 B1
(45) Date of Patent: Sep. 8, 2015

(54) SYSTEM, METHOD, AND COMPUTER PROGRAM PRODUCT TO DISTRIBUTE WORKLOAD

(75) Inventors: Gaurav Garg, San Jose, CA (US); David T. Hass, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 805 days.

(21) Appl. No.: 12/633,702

(22) Filed: Dec. 8, 2009

(51) Int. Cl.
G06F 9/46 (2006.01)
G06F 15/16 (2006.01)
G06F 9/50 (2006.01)

(52) U.S. Cl.
CPC .............. *G06F 9/5083* (2013.01); *G06F 9/50* (2013.01); *G06F 9/5005* (2013.01); *G06F 9/505* (2013.01); *G06F 9/5027* (2013.01); *G06F 9/5088* (2013.01)

(58) Field of Classification Search
USPC ............... 718/100, 104, 105; 719/313, 314
See application file for complete search history.

(56) References Cited

U.S. PATENT DOCUMENTS

| | | | | |
|---|---|---|---|---|
| 5,031,089 | A * | 7/1991 | Liu et al. | 709/226 |
| 6,728,961 | B1 * | 4/2004 | Velasco | 718/105 |
| 7,007,097 | B1 * | 2/2006 | Huffman et al. | 709/232 |
| 7,203,944 | B1 * | 4/2007 | van Rietschote et al. | 718/104 |
| 7,363,629 | B2 * | 4/2008 | Springer et al. | 719/314 |
| 7,370,081 | B2 * | 5/2008 | Springer, Sr. | 709/208 |
| 7,441,241 | B2 * | 10/2008 | Dawson et al. | 718/102 |
| 7,448,037 | B2 * | 11/2008 | Arimilli et al. | 718/104 |
| 7,454,754 | B2 * | 11/2008 | Tajima | 718/104 |
| 7,467,243 | B2 * | 12/2008 | Rashid et al. | 710/52 |
| 7,793,293 | B2 * | 9/2010 | Norton et al. | 718/102 |
| 8,015,567 | B2 * | 9/2011 | Hass | 718/105 |
| 8,478,811 | B2 * | 7/2013 | Garg et al. | 709/202 |
| 2002/0169816 | A1 * | 11/2002 | Meiri | 709/104 |
| 2002/0198923 | A1 * | 12/2002 | Hayes, Jr. | 709/102 |
| 2003/0212731 | A1 * | 11/2003 | Brenner et al. | 709/105 |
| 2004/0054999 | A1 * | 3/2004 | Willen et al. | 718/103 |
| 2004/0073909 | A1 * | 4/2004 | Arimilli et al. | 718/105 |
| 2004/0194097 | A1 * | 9/2004 | Spencer | 718/100 |
| 2005/0034130 | A1 * | 2/2005 | Skovira | 718/105 |
| 2005/0071844 | A1 * | 3/2005 | Flockhart et al. | 718/105 |
| 2005/0132379 | A1 * | 6/2005 | Sankaran et al. | 718/105 |
| 2005/0210472 | A1 * | 9/2005 | Accapadi et al. | 718/105 |
| 2005/0228900 | A1 * | 10/2005 | Stuart et al. | 709/234 |
| 2005/0240935 | A1 * | 10/2005 | Ramanathan | 718/105 |
| 2005/0278410 | A1 * | 12/2005 | Espino | 709/201 |
| 2006/0048157 | A1 * | 3/2006 | Dawson et al. | 718/104 |
| 2006/0123423 | A1 * | 6/2006 | Brenner | 718/105 |
| 2007/0170451 | A1 * | 7/2007 | Bansal | 257/99 |
| 2008/0034366 | A1 * | 2/2008 | Tanaka et al. | 718/1 |
| 2008/0126751 | A1 * | 5/2008 | Mizrachi et al. | 712/30 |

(Continued)

OTHER PUBLICATIONS

U.S. Appl. No. 12/325,050, filed Nov. 28, 2008, entitled "Network-On-Chip System, Method, And Computer Program Product for Transmitting Messages Utilizing a Centralized On-Chip Shared Memory Switch".

*Primary Examiner* — Charles Swift
(74) *Attorney, Agent, or Firm* — Sterne, Kessler, Goldstein & Fox PLLC (57) ABSTRACT

A system, method, and computer program product are provided for sending a message from a first queue to a second queue associated with a receiver agent in response to a request. In operation, a message is sent from a sender agent to a first queue. Additionally, a request is received at the first queue from a receiver agent. Furthermore, the message is sent from the first queue to a second queue associated with the receiver agent, in response to the request.

39 Claims, 5 Drawing Sheets

(56) References Cited

U.S. PATENT DOCUMENTS

| | | | |
|---|---|---|---|
| 2008/0168463 A1* | 7/2008 | Donohue et al. | 718/105 |
| 2009/0013327 A1* | 1/2009 | Bulfin | 718/105 |
| 2009/0019449 A1* | 1/2009 | Choi et al. | 718/105 |
| 2009/0055496 A1 | 2/2009 | Garg et al. | |
| 2010/0095299 A1* | 4/2010 | Gupta et al. | 718/103 |
| 2010/0162261 A1* | 6/2010 | Shashidhara | 718/105 |
| 2010/0262975 A1* | 10/2010 | Reysa et al. | 718/105 |
| 2011/0004889 A1* | 1/2011 | Medeiros et al. | 719/330 |

* cited by examiner

SYSTEM, METHOD, AND COMPUTER PROGRAM PRODUCT TO DISTRIBUTE WORKLOAD

FIELD OF THE INVENTION

The present invention relates to Network-on-Chip (NoC) systems, and more particularly to maximizing resource utilization using such systems.

BACKGROUND

With of the advent of System-on-Chips (SoC) and Chip-Multiprocessing (CMP), use of Network-on-Chips (NoC) is becoming more widespread. The various components (or agents) of the SoC send messages containing specific processing requests to each other through the NoC thereby communicating in a client-server fashion. One design challenge in any SoC is found in addressing the resourceutilization & load-balancing of various agents found in the SoC.

For example, conventional SoC architectures are implemented in such a way that one or more agents of the SoC may be idle or under-utilized while at the same time one or more other agents of the SoC may be overloaded. There is thus a need for addressing these and/or other issues associated with the prior art.

SUMMARY

A system, method, and computer program product are provided for re-directing a message from a first queue to a second queue associated with a receiver agent in response to a request. In operation, a message is sent from a sender agent to a first queue which may be associated with a first receiver agent. Additionally, a request is received at the first queue from a second receiver agent. Furthermore, the message is redirected from the first queue to a second queue associated with the receiver agent, in response to the request. In some embodiment, the first queue may not be associated with the second receiver agent.

DETAILED DESCRIPTION

Figure 1:
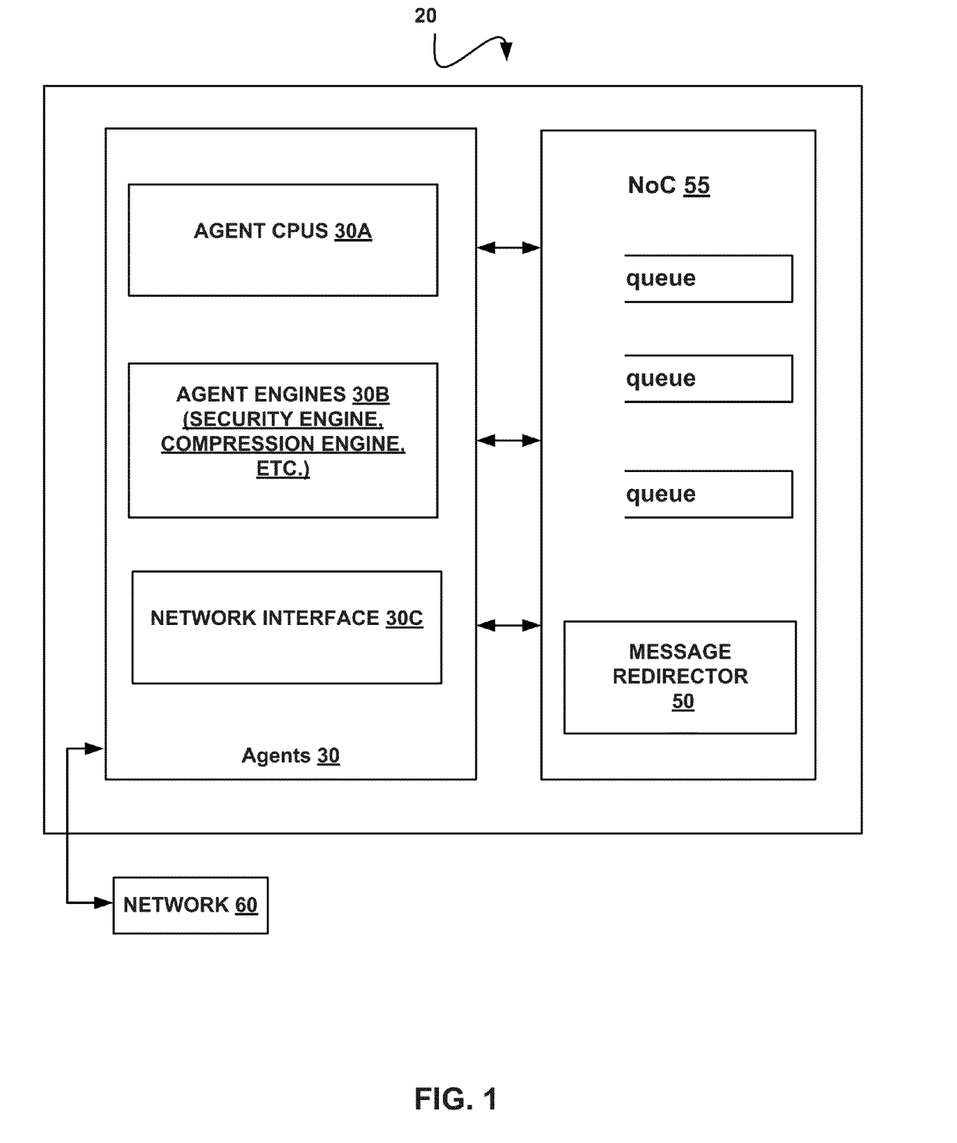
FIG. 1 shows an apparatus for sending a message from a first queue to a second queue associated with a receiver agent in response to a request, in accordance with one embodiment.

As shown in FIG. 1, a network processor 20 can be implemented by using massively parallel multi-threaded chip-multiprocessors integrated with various dedicated functional units (e.g., for individual packet processing sub-tasks) in a single SoC to communicate with network 60. Each functional unit may contain several identical processing engines. The workload for the network processor 20 may be handled by one or more general purpose agents 30, such as the CPU threads or dedicated processing engines in each functional units. Agent 30A corresponds to CPU-based agents. Agent 30B corresponds to engine-based agents such as security engines and compression engines. Agent 30C corresponds to network interface agents. While only three examples of agents 30A-C are shown in FIG. 1, it is noted that a network process 20 may have any number or types of such agents 30.

The CPUs, functional units, and networking interfaces in the network processor 20 communicate by sending messages to each other through a network-on-chip (NoC) 55. Each message typically contains instructions & other relevant information for a task to be performed by the receiver. When the receiver is done, the receiver sends a message to the next agent for the next task to be performed in the packet processing sequence.

According to the present embodiment, a message redirector 50 is employed to allow the network processor 20 to achieve improved performance and to maximize resource utilization. The message redirector 50 operates such that the available workload can be spread evenly among all available agents so that no CPU or processing engine is overloaded when another similar CPU or processing engine is idle or under-utilized.

According to some embodiments, this is achieved by letting agents (e.g., CPU's or processing engines) which are idle or under-utilized to snoop and redirect messages from another agents queues to itself. In addition, some embodiments also provide for general-purpose queues to which any agent can send a message but which send the message to an agent only upon receiving an explicit request from any other agent. This configuration lends itself very well to an architecture where multiple agents deposit their output messages in these general-purpose queues instead of being required to determine whether and/or which of several agents is available or capable of performing the next task in the packet-processing sequence.

The present approach provides significant advantages over alternative approaches that address load-balancing problems by using a scheduler to distribute messages among all the agents capable of processing it. This is because the scheduler approach needs to keep track of each agents status (i.e., how over-utilized or under-utilized it is) and estimate the time required to process each message. Usually it is difficult to keep track of each agent's status accurately.

The problem is that the scheduler performance can become the bottleneck if it cannot allocate the workload fast enough. Also, a scheduler does not lend itself very efficiently to where multiple agents need to distribute their output messages to a set of agents for the next task in the packet processing sequence.

Figure 2:
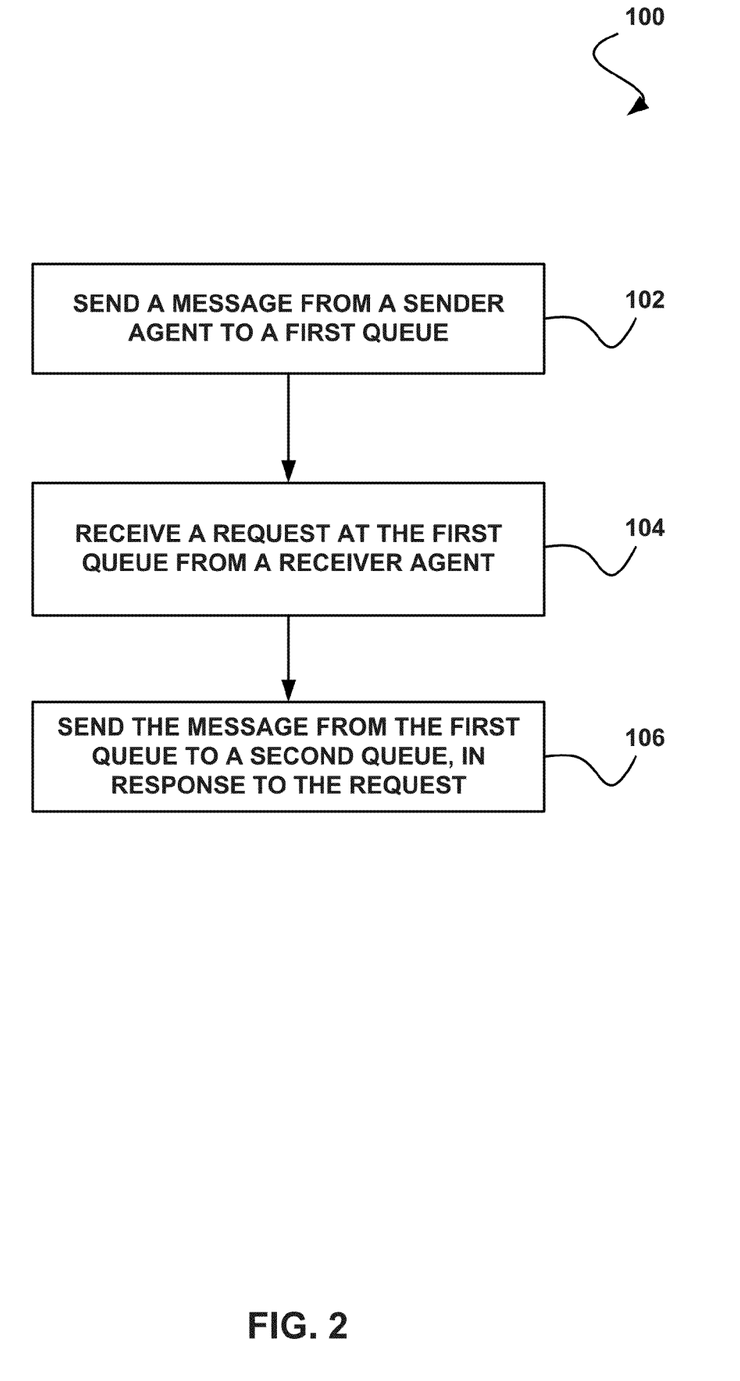
FIG. 2 shows a method for sending a message from a first queue to a second queue associated with a receiver agent in response to a request, in accordance with one embodiment.

FIG. 2 shows a method 100 for re-directing a message from a first queue to a second queue associated with a receiver agent in response to a request, in accordance with one embodiment. As shown in operation 102, a message is sent from a sender agent to a first queue.

In the context of the present description, the sender agent refers to any agent capable of sending a message. In one embodiment, the sender agent may include a central processing unit (CPU) thread. For example, the sender agent may include a general purpose CPU thread. In another embodiment, the sender agent may include a processing engine. For example, the sender agent may include a dedicated processing engine such as a networking interface, security-engine, compression-engine etc.

Additionally, in yet another embodiment, the sender agent may be contained within a functional unit. For example, the sender agent may include one of multiple sender agents contained within a functional unit. In another example, the functional unit may be integrated with a multi-threaded chip-multiprocessor. Further, in still another embodiment, the sender agent may be connected to a communication network. For example, the sender agent may be connected to a Network-on-Chip (NoC).

Further still, the message may include any data capable of being sent to the first queue. In one embodiment, the message may include instructions to be performed by a receiver agent. In another embodiment, the message may include information relating to a task to be performed by the receiver agent. For example, the message may include instructions along a address in memory where data to be processed is stored. For example, the message may include a task to be performed in a packet processing sequence by the receiver agent.

In yet another embodiment, the message may include one data packet or a plurality of data packets. For example, the message may include a single entry including 8 bytes of data along with a header that includes 1 byte software code, a source identifier (ID), a destination ID, a size, etc. In another example, the message may include 1 to 4 (or more) entries. In still another embodiment, the message may contain more than one packet and may be split into individual packets while traveling across the communication network.

Also, in the context of the present description, the first queue may include any structure capable of storing and retrieving one or more messages. For example, the first queue may include a first-in first-out (FIFO) queue. In one embodiment, the first queue may include a receiver queue associated with a particular receiver agent. For example, the first queue may be paired to the particular receiver agent. In another example, the first queue may include a push output queue paired to the particular receiver agent that automatically delivers the message to the particular receiver agent.

In another embodiment, the first queue may not necessarily be associated with any receiver agent. It might be a general purpose queue which is read by numerous receiver agents. For example, the first queue may include a general purpose queue. In another example, the first queue may include a pop output queue that is not paired to any receiver agent and that stores the message until a receiver agent requests the message from the first queue. Additionally, the first queue may be maintained in a central static random access memory (SRAM).

In addition, in one embodiment, the message may be sent from the sender agent to the first queue in response to an event. For example, after one task of a multi-task sequence has been performed by the sender agent, the sender agent may send a message relating to a next task of the sequence to the first queue. In another embodiment, the message may be sent from the sender agent to the first queue in response to a push request sent from the sender agent to the first queue. Further, in one embodiment, the message may be stored in the first queue. In another embodiment, the message may first be stored in a transmit queue, input queue, etc. associated with the sender agent en-route to the first queue before being sent to the first queue.

Additionally, as shown in operation 104, a request is received at the first queue from a receiver agent. In the context of the present description, the request may include any request relating to one or more messages in the first queue. For example, the request may include a request to send the message from the first queue to a second queue. In one embodiment, the request may include a pop request. For example, the request may include a pop request that requests the reading and redirection of the message from the first queue to the second queue. Further, the receiver agent may refer to any agent capable of receiving a message. In one embodiment, the receiver agent may have one or more of the same characteristics as the sender agent. In another embodiment, the receiver agent may be separate from the sender agent.

Further still, the request received at the first queue may be sent by the receiver agent in response to an event. For example, the request received at the first queue may be sent by the receiver agent in response to a determination (by the receiver agent or another entity) that the receiver agent is idle. In another example, the request received at the first queue may be sent by the receiver agent in response to a determination that the receiver agent is underutilized. In yet another example, the request received at the first queue may be sent by the receiver agent in response to a determination that a second queue associated with the receiver agent is empty.

In one embodiment, the first queue may be associated with another receiver agent. If it is determined that the first queue is associated with the other receiver agent, the request received at the first queue may be sent by the receiver agent in response to a determination (by the receiver agent or another entity) that the other receiver agent associated with the first queue is running slow, backing up, creating a performance bottleneck, is overloaded, is over-utilized in any manner, etc.

Additionally, as shown in operation 106, the message is sent from the first queue to a second queue associated with the receiver agent, in response to the request. In one embodiment, the second queue may be tied to the receiver agent. In another embodiment, the second queue may have been empty when the request was sent from the receiver agent to the first queue. In yet another embodiment, if the message at the first queue includes a plurality of data packets, all of the plurality of data packets may be sent from the first queue to the second queue in response to the request. Additionally, in one embodiment, the message may be stored in the second queue after it is re-directed from the first queue to the second queue.

Additionally, in one embodiment, a plurality of queues may be associated with the receiver agent. Further, in another embodiment, the receiver agent may prioritize queues associated with it. For example, the prioritization may be random, predetermined, or based on any other element.

Additionally, in one embodiment, upon receiving a request from the receiver agent, the first queue may determine that it does not have any messages and may send a special message (indicating that it was empty) to the second queue.

In still another embodiment, the method 100 may be implemented in the context of a data switch interconnect and messaging network coupled to a plurality of multithreaded processor cores. See, for example, U.S. Pat. No. 7,467,243, filed Aug. 31, 2004, which is hereby incorporated by reference in its entirety, and which describes an example of an advanced processor with a scheme for optimal packet flow in a multi-processor system on a chip.

Additionally, the method 100 may be implemented utilizing a shared memory switch. For example, the first queue and second queue may be incorporated within the shared memory switch. See, for example, U.S. patent application Ser. No. 12/325,050, filed Nov. 28, 2008, which is hereby incorporated by reference in its entirety, and which describes an example of transmitting messages utilizing a centralized on-chip shared memory switch.

In this way, the receiver agent may be prevented from becoming idle by preventing the second queue from becoming empty. Additionally, the receiver agent may relieve other receiver agents that have become over-utilized. As such, higher performance and maximized resource utilization may be achieved through load balancing among agents.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
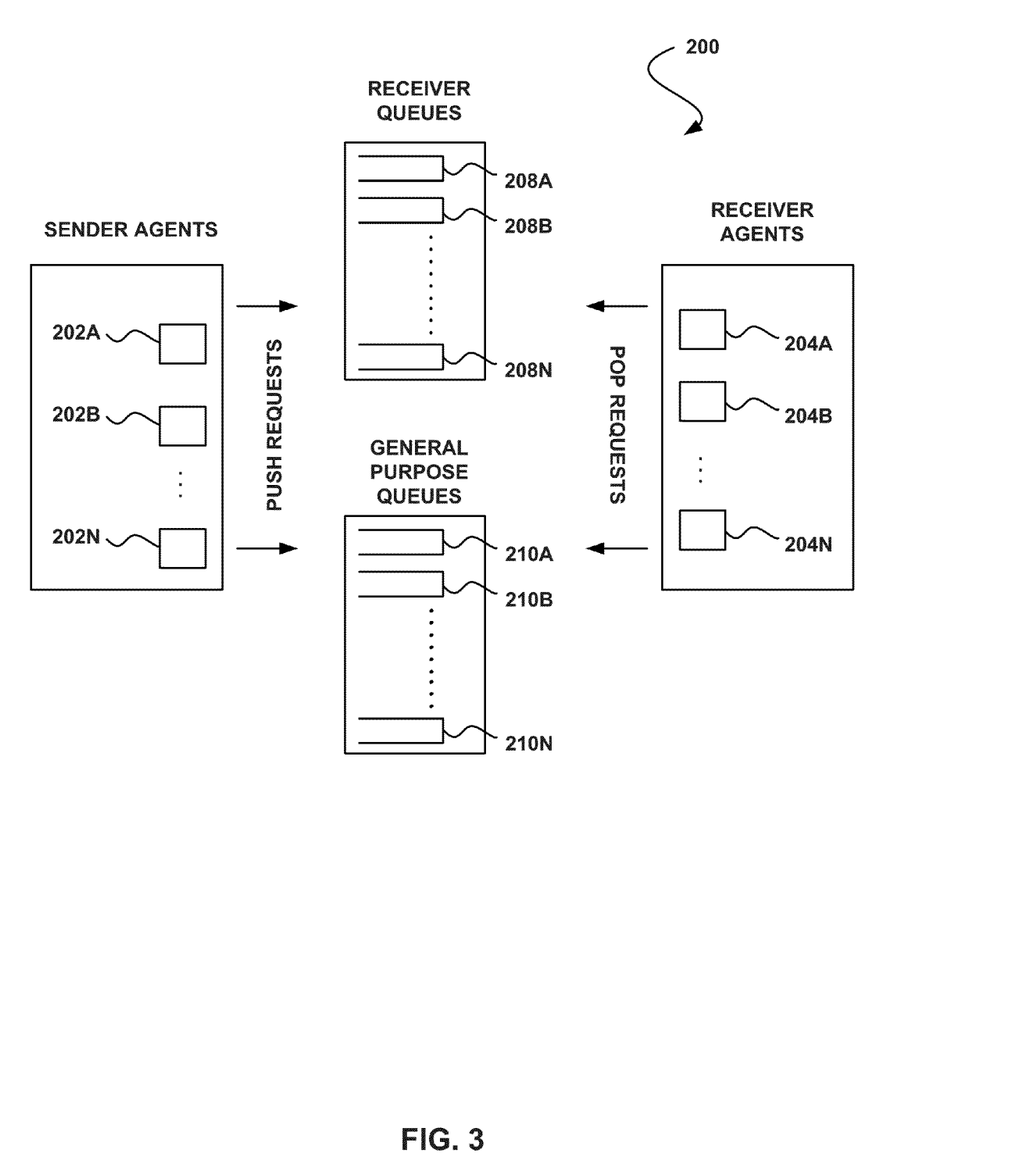
FIG. 3 shows a multiprocessor system for sending a message from a first queue to a second queue associated with a receiver agent in response to a request, in accordance with another embodiment.

FIG. 3 shows a multiprocessor system 200 for sending a message from a first queue to a second queue associated with a receiver agent in response to a request, in accordance with one embodiment. As an option, the present system 200 may be implemented to carry out the apparatus or method of FIGS. 1-2. Of course, however, the system 200 may be implemented in any desired environment. It should also be noted that the aforementioned definitions may apply during the present description.

As shown, the system 200 includes a plurality of sender agents 202A-N, as well as a plurality of receiver agents 204A-N. Additionally, the system 200 includes a plurality of receiver queues 208A-N and general purpose queues 210A-N. Further, each of the receiver agents 204A-N is associated with one or more of the receiver queues 208A-N. For example, each of the receiver queues 208A-N may be paired to a respective one of the receiver agents 204A-N. Additionally, each of the receiver queues 208A-N may automatically deliver messages in the queue to the receiver agent 204A-N to which they are paired. On the other hand, none of general purpose queues 210A-N may be bound to any of the receiver agents 204A-N.

In one embodiment, one of sender agents 202A-N may send a push request to one or more of receiver queues 208A-N or general purpose queues 210A-N. For example, sender agent 202A may send a push request to receiver queue 208B in order to send a message from sender agent 202A to receiver queue 208B, where the message is then stored in receiver queue 208B. Additionally, in another example, sender agent 202B may send a push request to general purpose queue 210A in order to send a message from sender agent 202B to general purpose queue 210A, where the message is stored in general purpose queue 210A.

Additionally, in one embodiment, one or more actions may be taken if it is determined that one of receiver queues 208A-N is full. For example, the space in the queues may be allocated among all the agents capable of sending to that queue & each sender agent may check if it has exhausted the space allocated to it, e.g., as described in U.S. patent application Ser. No. 12/261,808, filed Oct. 30, 2008, which is hereby incorporated by reference in its entirety. For example, sender agent 202B may initially send a push request 206B to receiver queue 208A in order to send a message from sender agent 202B to receiver queue 208A. However, if it is determined that receiver queue 208A is full, receiver queue 208A may send a notification that it is full to sender agent 202B.

In response to the determination that receiver queue 208A is full, sender agent 202B may then send a push request to one of receiver queues 208A-N other than receiver queue 208A. In another example, in response to the receipt of the notification that receiver queue 208A is full, sender agent 202B may then send a push request to one of general purpose queues 210A-N.

Further, in another embodiment, one of sender agents 202A-N may send a push request to one of general purpose queues 210A-N only if one or more conditions are satisfied.

For example, one of sender agents 202A-N may send a push request to one of general purpose queues 210A-N only if all of receiver queues 208A-N are full.

In yet another embodiment, one of the receiver agents 204A-N may request a message from one of its associated receiver queues 208A-N excluding the queues associated with it. For example, when receiver agent 204A has completed processing a message, it may send a request to the receiver queue 208A-N excluding 208A to which it is bound in order to redirect an additional message to the respective receiver queue 208A. In response to the request, the respective one of the receiver queues 208A-N excluding 208A may then redirect the message to receiver queue 208A.

In still another embodiment, one of the receiver agents 204A-N may request a message from one of the general purpose queues 210A-N. For example, receiver agent 204B may complete the processing of a message, and may send a pop request to general purpose queue 210A-N to redirect a message to the receiver queue 208B to which it is bound in order to retrieve an additional message.

However, in another embodiment, if the general purpose queue 210A-N is empty when the pop request is received from receiver agent 204B, then general purpose queue 210A-N may return a notification to receiver queue 208B (which may ultimately be delivered to the receiver agent 204B) that the receiver queue 208B is empty. For example, the general purpose queue 210A-N may return an empty message to the receiver queue 208B to be sent to the receiver agent 204B if the general purpose queue 210A-N is empty when the pop request is received from receiver agent 204B.

In one embodiment, the receiver agents 204A-N may include an apparatus to determine that their associated queues 208A-N are empty causing them to send a pop request to another queue. For example, upon discovering that its receiver queue 208B is empty, receiver agent 204B may send a pop request to general purpose queue 210A. If the general purpose queue 210A is empty, it too will return a notification to the receiver agent 204B that the general purpose queue 210A is empty, and the receiver agent 204B may then send a message request to another of the general purpose queues 210A-N.

Additionally, if the general purpose queue 210A does contain a message, it may return the message to the receiver agent 204B that sent the request. For example, if the general purpose queue 210A contains a message, the general purpose queue 210A may redirect the message from the general purpose queue 210A to the receiver queue 208B to which the receiver agent 204B is bound in response to the receiver agent 204B's pop request.

In this way, sender agents 202A-N may deposit messages in general purpose queues 210A-N instead of attempting to determine which of receiver agents 204A-N is available for performing a task in a packet processing sequence using a scheduler or other means which can potentially become a bottleneck.

Further, in another embodiment, one of the receiver agents 204A-N may request a message from one of the receiver queues 208A-N to which it is not associated. For example, if receiver agent 204B determines that the receiver queue 208B is empty, the receiver agent 204B may send a pop request to one of the receiver queues 208A-N other than receiver queue 204B.

In yet another embodiment, one of the receiver agents 204A-N may request a message from a particular one of the receiver queues 208A-N to which the receiver agent is not associated in response to a particular determination. For example, if it is determined that receiver agent 204B is overloaded (e.g., has too many messages in its associated receiver queue 208B, etc.), then receiver agent 204A may be alerted and may send a pop request to receiver agent 204B's associated receiver queue 208B. Receiver queue 208B may then send one or more messages to receiver agent's 204A associated receiver queue 208A in response to receiver agent's 204A pop request. In this way, receiver agent 204A may assist receiver agent 204B when the latter is overloaded by reducing an amount of messages in its associated receiver queue 208B.

Also, in one embodiment, one of the receiver agents 204A-N may request a message from one or more of receiver queues 208A-N to which the receiver agent is not associated or may request a message from one or more general purpose queues 210A-N in response to a particular determination. For example, receiver agent 204A may send a pop request to one or more of receiver queues 208A-N to which it is not associated or to one or more of general purpose queues 210A-N if it determined that receiver agent 204A is idle, underutilized, etc. When one or more of the receiver queues 208A-N or general purpose queues 210A-N receive the pop request from receiver agent 204A, they may send one or more messages stored in the respective queue to one or more of receiver queues 208A-N which are associated with receiver agent 204A.

In this way, receiver agents 204A-N may maximize resource utilization by spreading messages in an even manner amongst all receiver agents 204A-N, such that no agents are overloaded, idle, or under-utilized.

Figure 4:
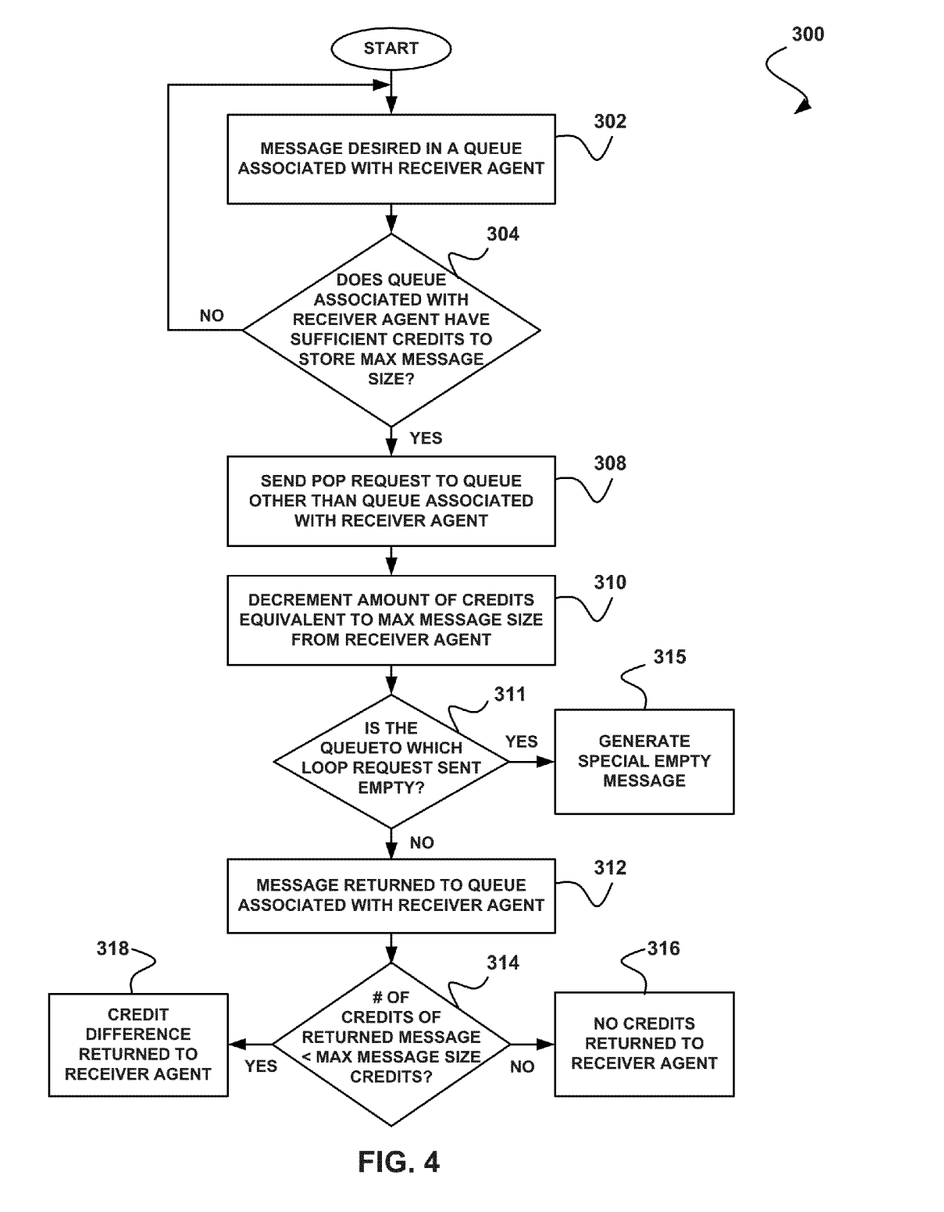
FIG. 4 shows a method for ensuring that a receiver agent queue has sufficient free space to support a pop request, in accordance with yet another embodiment.

FIG. 4 shows a method 300 for ensuring that a queue associated with a receiver agent has sufficient free space to support a pop request, in accordance with yet another embodiment. As an option, the method 300 may be carried out in the context of the functionality and architecture of FIGS. 1-3. Of course, however, the method 300 may be carried out in any desired environment. It should also be noted that the aforementioned definitions may apply during the present description.

As shown in operation 302, it is determined that a message is desired in a queue associated with a receiver agent. In one embodiment, it may be determined that the receiver agent is idle. In another embodiment, it may be determined that the receiver agent is underutilized. In still another embodiment, it may be determined that a second receiver agent other than the receiver agent is overloaded. Of course, however, it may be determined that the message is desired in the queue associated with the receiver agent in any manner.

Additionally, as shown in decision 304, it is determined whether the queue associated with the receiver agent has sufficient credits to store a maximum message size. In one embodiment, one or more credits may be allocated to the receiver agent, where each credit is representative of at least a portion of a message. For example, each credit represents one unused entry in a queue. In this way, the amount of credits allocated to the receiver agent may indicate the amount of unused entries in the queue associated with the receiver agent. Additionally, see, for example, U.S. patent application Ser. No. 12/261,808, filed Oct. 30, 2008, which is hereby incorporated by reference in its entirety, and which describes an example of providing for optimal packet flow in a multiprocessor system on a chip using credits.

Thus, in one embodiment, it may be determined whether an amount of credits equal to a particular message size has been allocated to the receiver agent. For example, a size of the message may be measured by the number of entries that the message fills in a queue when stored. Additionally, the size of one or more messages currently stored in queues other than the queue associated with the receiver agent may be recorded, and the largest of those message sizes may be determined and compared to the amount of credits allocated to the receiver agent. In this way, it may be determined whether the queue associated with the receiver agent has sufficient free space to store the largest of the messages currently stored, in queues other than the queue associated with the receiver agent.

If it is determined in decision 304 that the queue associated with the receiver agent does not have sufficient credits to store a maximum message size, then the method 300 returns to operation 302. However, if in decision 304 it is determined that the queue associated with the receiver agent does have sufficient credits to store a maximum message size, then in operation 308 a pop request is sent by the receiver agent to a queue other than the queue associated with the receiver agent.

For example, the receiver agent may send a pop request to a receiver queue other than the receiver agent's associated receiver queue. In another example, the receiver agent may send a pop request to a general purpose queue. Additionally, in operation 310 the amount of credits equivalent to the maximum message size is decremented from the receiver agent. In this way, it is assured that the queue associated with the receiver agent has sufficient free space to support a pop request for any message currently stored in queues other than the queue associated with the receiver agent, thereby avoiding message blocking and enabling flow control for the queue associated with the receiver agent.

A determination is made at decision 311 whether the queue to which the pop request is sent is empty. If so, then a special message is generated in operation 315 to indicate the empty state of the queue.

Otherwise, in operation 312 a message is returned to the queue associated with the receiver agent in response to the pop request. For example, the queue that received the pop request from the receiver agent may send the message to the queue associated with the receiver agent in response to the pop request.

Further still, in decision 314 it is determined whether the number of credits equivalent to the size of the returned message is less than the number of credits equivalent to the maximum message size. If it is determined in decision 314 that the number of credits equivalent to the size of the returned message is not less than the number of credits equivalent to the maximum message size, then in operation 316 no credits are returned to the receiver agent.

However, if it is determined in decision 314 that the number of credits equivalent to the size of the returned message is less than the number of credits equivalent to the maximum message size, then in operation 318 the difference between the number of credits equivalent to the size of the returned message and the number of credits equivalent to the maximum message size is immediately returned to the receiver agent. In this way, the receiver agent will have an updated amount of credits equivalent to the amount of free space in its associated queue after the requested message has been received.

Figure 5:
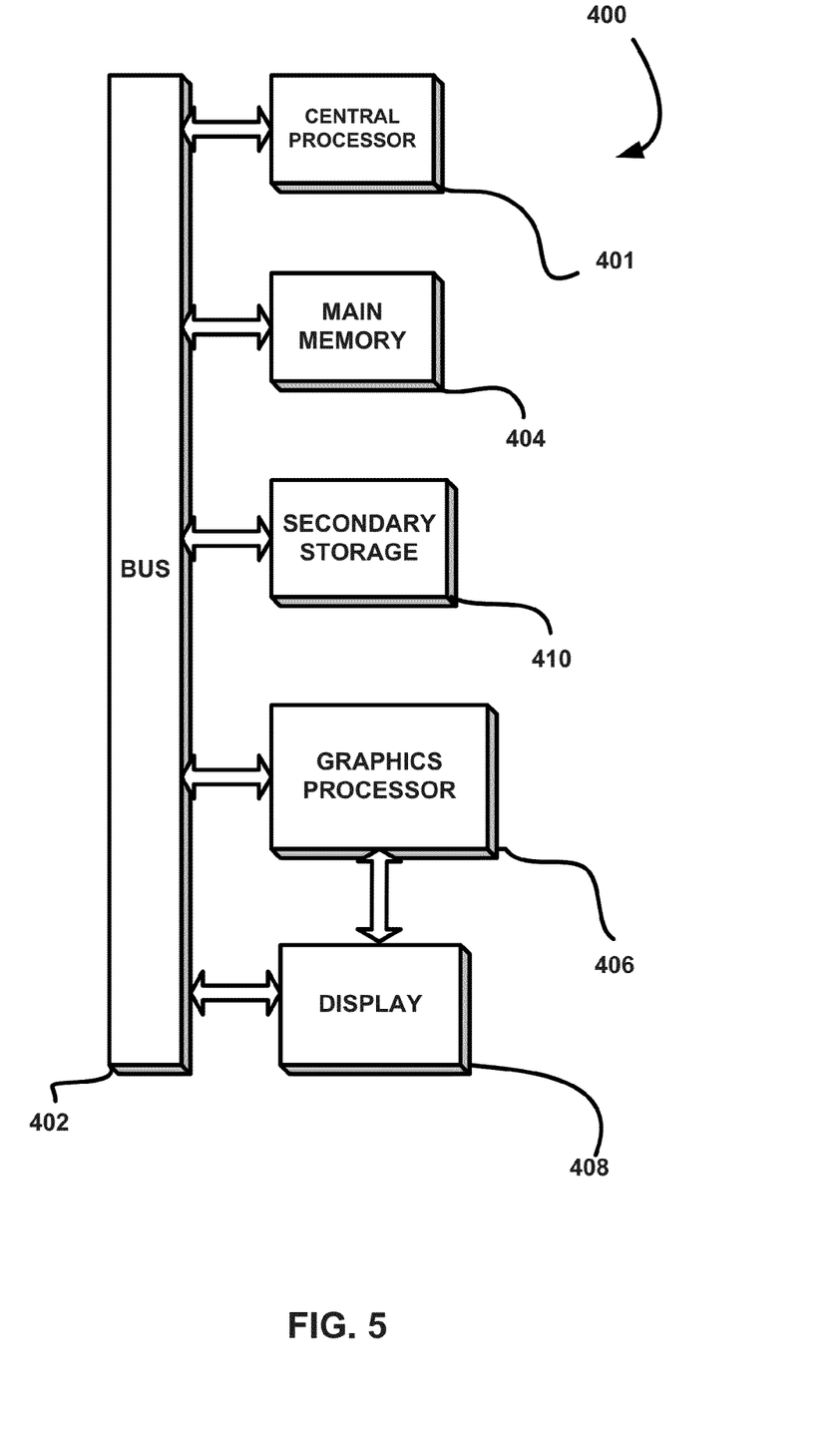
FIG. 5 illustrates an exemplary system in which the various architecture and/or functionality of the various previous embodiments may be implemented.

FIG. 5 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such cbmputerprograms, when executed, enable the system 400 to perform various functions. Memory 404, storage 410 and/or any other storage are possible examples of computer-readable media.

In one embodiment, the architecture and/or functionality of the various previous FIGS. may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous FIGS. may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
sending a message from a sender agent to a first queue of an over-utilized processor;
monitoring, by an under-utilized processor associated with a second queue, the first queue;
determining a size of the message based on a number of entries that the message would fill in the second queue if stored;
determining whether sufficient credits have been allocated to the second queue to store the message based on the size of the message;
redirecting the message, by the under-utilized processor, from the first queue to the second queue when it is determined that the sufficient credits have been allocated to the second queue; and
deducting a number of credits corresponding to the size of the message from the sufficient credits.

2. The method of claim 1, further comprising:
storing the message in the first queue.

3. The method of claim 1, wherein the redirecting comprises:
redirecting the message in response to an event.

4. The method of claim 1, wherein the redirecting comprises:
redirecting by the under-utilized processor in response to a determination that the under-utilized processor is idle.

5. The method of claim 1, wherein the redirecting comprises:
redirecting by the under utilized processor the message in response to a determination that the under-utilized processor is under-utilized.

6. The method of claim 1, wherein the first queue is associated with a second over-utilized processor.

7. The method of claim 6, wherein the redirecting comprises:
redirecting the message in response to a determination that the second over-utilized processor is over-utilized.

8. The method of claim 1, wherein the redirecting comprises:
redirecting the message in response to a determination that the second queue is empty.

9. The method of claim 1, wherein the first queue includes a receiver queue associated with another under-utilized processor.

10. The method of claim 1, wherein the first queue includes a general purpose queue.

11. The method of claim 1, wherein the second queue is paired to the under-utilized processor.

12. The method of claim 1, wherein the sender agent includes a central processing unit (CPU) thread.

13. The method of claim 1, wherein the sending the message comprises:
sending a plurality of data packets.

14. The method of claim 1, further comprising:
storing the message in the second queue after it is redirected from the first queue to the second queue.

15. The method of claim 1, wherein a plurality of queues are associated with the under-utilized processor.

16. A computer program product embodied on a non-transitory computer readable medium, comprising:
computer code for sending a message from a sender agent to a first queue of an over-utilized processor;
computer code for monitoring, by an under-utilized processor associated with a second queue, the first queue;
computer code for determining a size of the message based on a number of entries that the message would fill in the second queue if stored;
computer code for determining whether sufficient credits have been allocated to the second queue to store the message based on the size of the message;
computer code for redirecting the message, by the under-utilized processor, to the second queue when it is determined that the sufficient credits have been allocated to the second queue; and
computer code for deducting a number of credits corresponding to the size of the message from the sufficient credits.

17. The computer program product of claim 16, further comprising:
computer code for storing the message in the first queue.

18. The computer program product of claim 16, wherein the computer code for redirecting comprises:
computer code for redirecting the message in response to an event.

19. The computer program product of claim 16, wherein the computer code for redirecting comprises:
computer code for redirecting the message in response to a determination that the under-utilized processor is idle.

20. The computer program product of claim 16, wherein the computer code for redirecting comprises:
computer code for redirecting the message in response to a determination that the under-utilized processor is under-utilized.

21. The computer program product of claim 16, wherein the first queue is associated with a second over-utilized processor.

22. The computer program product of claim 21, wherein the computer code for redirecting comprises:
computer code for redirecting the message in response to a determination that the second over-utilized processor is over-utilized.

23. The computer program product of claim 19, wherein the computer code for redirecting comprises:
computer code for redirecting the message in response to a determination that the second queue is empty.

24. The computer program product of claim 16, wherein the first queue includes a receiver queue associated with a second over-utilized processor.

25. The computer program product of claim 16, wherein the first queue includes a general purpose queue.

26. The computer program product of claim 16, wherein the second queue is paired to the under-utilized processor.

27. The computer program product of claim 16, wherein the computer code for sending the message comprises:
computer code for sending a plurality of data packets.

28. The computer program product of claim 16, wherein the computer code for sending the message comprises:
computer code for sending the message in response to a push request sent from the sender agent to the first queue.

29. The computer program product of claim 16, further comprising:
computer code for storing the message in the second queue after it is redirected from the first queue to the second queue.

30. The computer program product of claim 16, wherein a plurality of queues is associated with the under-utilized processor.

31. An apparatus, comprising:
a sender agent, associated with a first queue of an over-utilized processor, configured to send a message to the first queue; and
an under-utilized processor, associated with a second queue, configured to:
monitor the first queue,
determine a size of the message based on a number of entries that the message would fill in the second queue if stored,
determine whether sufficient credits have been allocated to the second queue to store the message based on the size of the message,
redirect the message from the first queue to the second queue when it is determined that the sufficient credits have been allocated to the second queue, and
deduct a number of credits corresponding to the size of the message from the sufficient credits.

32. The apparatus of claim 31, wherein the under-utilized processor is configured to redirect the message in response to a determination that the second queue is empty.

33. The apparatus of claim 32, wherein the message is stored in the first queue.

34. The apparatus of claim 32, wherein the under-utilized processor is configured to redirect the message in response to an event.

35. The apparatus of claim 32, wherein the under-utilized processor is configured to redirect the message in response to a determination that the under-utilized processor is idle.

36. The apparatus of claim 32, wherein the under-utilized processor is configured to redirect the message in response to a determination that the underutilized processor is under-utilized.

37. The apparatus of claim 32, wherein the first queue includes a receiver queue associated with another under-utilized processor.

38. The apparatus of claim 32, wherein the second queue is configured to be paired to the under-utilized processor.

39. The apparatus of claim 31, wherein the message includes a plurality of data packets.

* * * * *

UNITED STATES PATENT AND TRADEMARK OFFICE
CERTIFICATE OF CORRECTION

| | | |
|---|---|---|
| PATENT NO. | : 9,128,771 B1 | |
| APPLICATION NO. | : 12/633702 | |
| DATED | : September 8, 2015 | |
| INVENTOR(S) | : Garg et al. | |

It is certified that error appears in the above-identified patent and that said Letters Patent is hereby corrected as shown below:

Specification

Column 9, Line 21. Please replace "cbmputerprograms" with --computer programs--.

Claims

Column 10, Line 19 Claim 5. Please replace "redirecting by the underutilized processor the message" with --redirecting the message--.

Signed and Sealed this
Twenty-ninth Day of March, 2016

Michelle K. Lee
*Director of the United States Patent and Trademark Office*